Aug. 26, 1930.   J. B. COOPER   1,774,357
CONDUIT CAP
Filed Dec. 14, 1928

Inventor
Jacob B. Cooper
By
Hubert Hicks   Attorney

Patented Aug. 26, 1930

1,774,357

UNITED STATES PATENT OFFICE

JACOB B. COOPER, OF PARK RIDGE, NEW JERSEY

CONDUIT CAP

Application filed December 14, 1928. Serial No. 326,079.

This invention relates to certain improvements in conduit caps; and the nature and objects of the invention will be readily recognized and understood by those skilled in the arts involved in the light of the following explanation and detailed description of the accompanying drawings illustrating what I at present believe to be the preferred embodiments or mechanical and electrical expressions of my invention from among various other forms, arrangements, combinations, and constructions of which the invention is capable within the spirit and the scope thereof.
More particularly the invention is directed to so-called conduit caps which are employed on the exposed ends of electrical conduits, as a terminal or junction fitting for receiving and protecting the end lengths of electric wires or cables in such conduits. As electrical conduits used in electrical installations are generally of varying and different stock sizes or diameters, it is necessary to carry several sizes of such conduit caps in stock so as to be prepared for the different sizes of conduit used. This entails added expense and trouble, and a general object of the present invention is to provide such a conduit cap which is capable of and adapted to mounting and connection on different sizes of electrical conduit, so as to do away with the necessity for carrying the several sizes of separate caps to meet the requirements of and fit onto such conduits.
Another object of the invention is to provide a conduit cap of extremely simple and efficient construction capable of quantity production at relatively small cost, which cap embodies a removable closure plate by which the cap is mounted on and attached to the end of a conduit and through which the electrical conductors from the conduit may be led, which cap structure and arrangement provides an exceedingly simple but positive fastening and attaching means for securing the plate in and to the cap and through the medium of which the closure plate can be easily and quickly released for removal from the cap and for repositioning therein where required.

With the foregoing, and certain other objects and results in view which will readily appear from the following description, the invention consists in certain novel features in construction and in combinations and arrangements of parts as will be more fully and particularly referred to and specified hereinafter.

Referring to the accompanying drawings in which similar reference characters refer to corresponding parts throughout the several figures thereof.

Figure 1:
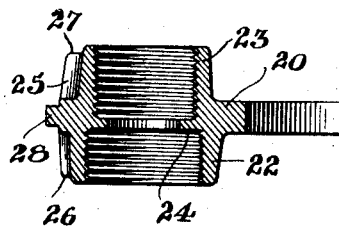
Fig. 1, is a vertical, longitudinal section through the closure plate of the conduit cap of the invention.
Figure 3:
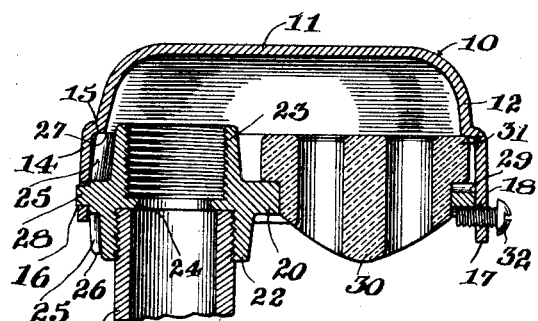
Fig. 3, is a vertical, longitudinal section taken on the line 3—3, of Fig. 2, and showing the conduit cap in attached position on a conduit.
Figure 2:
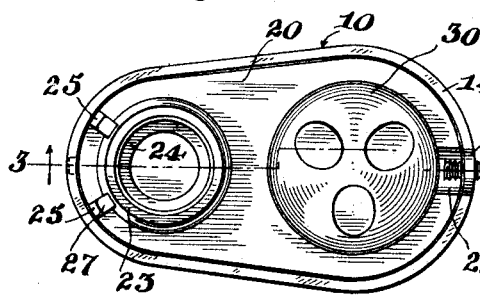
Fig. 2, is a plan view of the closure plate in assembled position secured on and in the conduit cap body.

In accordance with the examples of the invention disclosed herewith, referring particularly to the form thereof of Fig. 1, a conduit cap includes the elongated rounded or curved top, dome-like cap body 10 having the opposite or lower side thereof open, and slightly longitudinally tapered or decreasing in width toward one end thereof. This cap body comprises the rounded top wall 11 and the curved side wall 12 therearound terminating in the outwardly flared or laterally offset side wall portion 14 providing the internal shoulder or seat 15 therearound at its point of merger with the side wall 12, within the cap body 10. At one end thereof and along the longitudinal center of the cap body 10, the flared wall portion 14 is provided with a bore or opening 16 therethrough, while at the opposite end and centrally thereof the flared wall portion 14 is provided with an extension or ear 17 with a threaded bore 18 through this ear and the wall portion 14.

A closure plate 20 is provided for positioning within the cap body 10, and closing the open side of the cap body, this closure plate 20 conforming in outline and plan to the interior shape of the open side of the cap body as defined by the offset side wall portion 14. At the enlarged or wider end the closure plate 20 is formed with an enlarged recess or opening 21 therethrough for receiving a suitable insulator as will be referred to hereinafter. At the opposite or reduced width end, the closure plate 20 is provided with the axially alined bosses 22 and 23 extending from opposite sides thereof. One of these bosses, in this instance the boss 22 has an internal diameter greater than that of the other boss 23 and is internally threaded or taped to receive, for example the threaded end of a three quarter inch conduit, while the opposite boss 23 is internally threaded or taped to receive the end of an electrical conduit, say of one-half inch diameter. Between the inner ends of these two bosses and substantially in the plane of the cover plate 20, an internal flange or shoulder 24 is provided which forms a stop for and bears against the inner end of a conduit received in either the boss 22 or the boss 23.

On the outer side of the bosses 22 and 23 at the reduced width end of the closure plate 20, spaced ribs 25 are provided longitudinally of the bosses, and these bosses form at their opposite ends the abutments 26 adjacent the outer end of boss 22, and the abutments 27 adjacent the outer end of the boss 23, on the exterior of the bosses.

The reduced width end of the closure plate 20 is provided with a pin 28 extending from the edge and substantially within the plane thereof along the longitudinal center of the plate and between the ribs 25. At the opposite or wider end of the closure plate 20 and along the longitudinal center thereof depressions or recesses 29 are formed on opposite sides thereof, respectively, for a purpose to be explained later.

The closure plate 20 so formed and arranged is mounted and fitted in and closing the open side of the cap body 10, by first inserting the pin 28 at the reduced width end of the plate into and through the bore 16 at the reduced end of the flange portion 14 of side wall of the cap, with the boss 22 positioned on the outside or exterior of the cap if a three quarter inch conduit is to be attached thereto, or with the boss 23 positioned on the outside or exterior if a one-half inch conduit is to be attached thereto.

In either position the abutments 26 or 27, as the case may be, will seat on and bear against the internal flange 15 of the body to position and support this end of the cover plate in the body 10. A conventional porcelain insulator 30 having the flanged base 31 is inserted in the large width end of cap body 10 with the body of the insulator received in and extended outwardly through the recess or opening 21 in the cover plate and the flanged base 31 of this insulator held and secured between the internal shoulder 15 of the cap body and the closure plate, the end of the cover supported on the insulator base flange 31. A fastening or securing screw 32 is threaded into the bore 17 at the enlarged end of cap body 10 and extends inwardly over and across and is received in either of the recesses 29 which is disposed on the outer or exterior side of the plate, to thus secure and maintain the closure plate and insulator 30 in assembled position on the cap body.

In mounted position the cap is secured and attached to the end of a conduit C by threading the conduit end into that boss of the closure plate which will fit and receive the same and is exposed on the exterior of the plate and cap, and the ends of electrical wires (not shown) which are housed in the conduit are extended inwardly through the boss at the opposite or inner side of the closure plate and then through the cap body and outwardly through the electrical insulator 30, in the usual manner. In mounted position the end of the conduit and the electrical wires extending through the cap are efficiently protected against the weather or undesired contacts. The closure plate is quickly and easily removed simply by withdrawing the fastening screw 32 and can be as quickly inserted and secured in proper assembled position by this screw. When it is desired to adapt the cap for either size or diameter of conduit it is merely necessary to remove and reverse the closure plate to position the desired diameter boss on the exterior side thereof. In this manner the necessity for carrying two sizes of conduit caps is eliminated as the single cap is adapted to efficient and proper mounting and attachment on and to either size of conduit.

Figure 5:
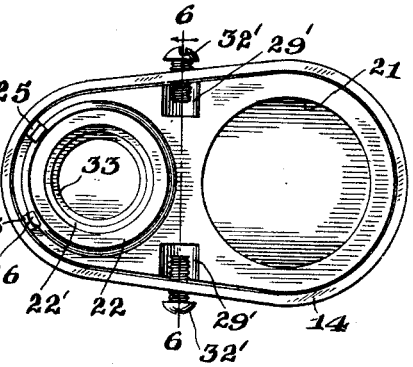
Fig. 5, is a plan view of a closure plate of Fig. 4 in assembled position on a conduit cap body, but showing a modified form and arrangement of securing screws for the closure plate.
Figure 4:
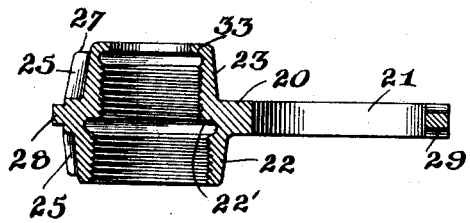
Fig. 4, is a vertical, longitudinal section through a closure plate of the conduit cap, showing a modified form and arrangement of the conduit socket forming and attaching bosses.

A modified form of the closure plate of the invention and of the conduit end receiving bosses thereon is disclosed in Figs. 4 and 5 of the drawing. In this form it is unnecessary to reverse the closure plate to adapt the same to the different sizes or diameters of conduit.

This result is accomplished by eliminating the inner flange or shoulder 24 between the inner ends of bosses 22 and 23 and which obstructs the inner end of the smaller boss bore 23, and providing a flange or stop shoulder 33 around the outer end of the smaller internal diameter boss 23. By this construction and arrangement an internal shoulder or seat 22' is provided at the inner end of the large diameter boss 22, but which shoulder 22' does not obstruct or extend over the inner end of the smaller diameter boss. Thus, by this arrangement the closure plate 20 is mounted in the manner hereinbefore described with the larger diameter boss 22 positioned on the outer or exterior side of the closure plate in its mounted and assembled position on and in the cap body 10, and it is then possible to thread thereinto either a conduit end of the larger diameter or a conduit end of the smaller diameter; in the latter case the conduit end extending through boss 22 to and threaded into the boss 23 until the conduit end engages the outer end flange or shoulder 33 of this boss, and in the former case the conduit end threaded into boss 22 until the conduit end engages the stop shoulder 22' at the inner end of boss 22.

Figure 6:
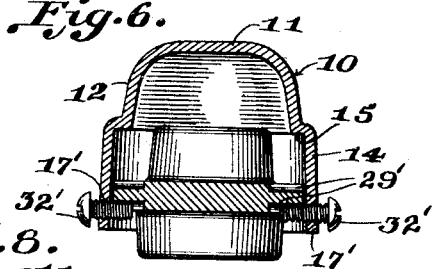
Fig. 6, is a vertical, transverse section taken on the line 6—6, of Fig. 5.
Figure 7:
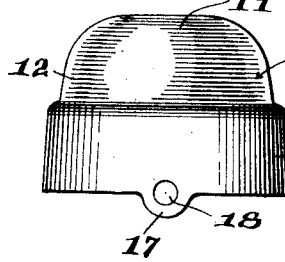
Fig. 7, is an end elevation of the conduit cap body of Figs. 2 and 3.
Figure 8:
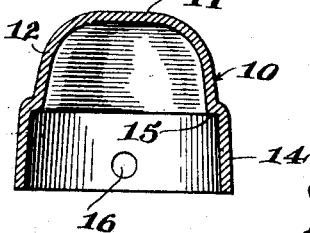
Fig. 8, is a transverse vertical section through the cap body of Figs. 2 and 3, with the closure plate removed.

In another modification of the construction and arrangement of the closure plate 20 and its securing means, shown by Figs. 5 and 6 of the drawings, the pin 28 is eliminated along with the end recesses 29, and in place thereof opposite side recesses 29' are formed on the closure plate at an intermediate point, and the opposite side walls of the cap body 10 are provided with the threaded bores 17' which receive suitable screws 32' to extend over the closure plate and be received into the opposite side recesses in order to fasten and secure the plate in its assembled position. With this arrangement, however, it is also possible, if desired or found expedient, to retain the closure plate end pin 28, although such pin is not generally found necessary in order to obtain the desired securing of the closure plate in and to the cap body 10.

The foregoing designs, arrangements, and constructions of electrical conduit caps thus eliminate the necessity for stocking and carrying a plurality of caps adapted to fit the different standard or stock sizes of electrical conduits in general use, and provide such a cap adapted to be attached to and used with and on the different conduit sizes or diameters. The construction of the caps is of extreme mechanical simplicity, while retaining therefor the necessary electrical and protection efficiency in use, and the design and arrangement of the closure plate and cooperating cap body enables easy and quick assembly or disassembly, and facility in attaching or removing the same to and from a conduit.

Attention is here directed to the fact that the invention contemplates and includes, the formation of the cover plate conduit receiving and attaching bosses to receive more than two different sizes of conduits, by the mere multiplication of different size and taped bores in the bosses, or by consolidating the two types or boss arrangements shown by the examples hereof, into a single boss arrangement for a cover plate, all as will be readily apparent to those skilled in the art from the accompanying drawings and the above explanation and description thereof.

It is also evident that various other changes, modifications, variations and substitutions might be resorted to without departing from the spirit and scope of my invention, and hence I do not wish to restrict or limit myself to the exact and specific disclosures hereof.

Desiring to protect my invention in the broadest manner legally possible, what I claim, is:

1. A conduit cap comprising, a cap body, and a removable and reversible plate member mounted at one side of said body and provided with conduit end receiving members on opposite sides thereof, respectively, said plate member reversible to present either side thereof outwardly with its conduit end receiving member in operative position on the cap body.

2. A conduit cap comprising, an open side cap body, and a closure member removably secured in the open side of the body, said closure member constructed and arranged at opposite sides thereof to receive and be attached to conduits of different diameters, and the said closure reversible to present either side thereof for attachment to a conduit.

3. A conduit cap comprising, an open side cap body, and a closure plate removably secured across the open side of the cap body, said closure plate formed with socket members on opposite sides thereof for receiving and attaching the cap body and plate to conduits of different diameters, respectively, the said plate reversible to operatively present the sockets at either side thereof.

4. A conduit cap comprising an open side cap body, a plate member removably and reversibly secured in the body open side, and said plate member formed on opposite sides thereof with different diameter conduit receiving and attaching sockets, the plate member reversible to operatively present the socket at either side thereof.

5. A conduit cap comprising an open side cap body, a closure plate removably and reversibly secured at the open side of the body, and a conduit receiving socket forming boss formed on each side of said plate, said bosses providing sockets of different diameters to receive and be attached to different size conduits, respectively, the said plate reversible to operatively present the socket forming boss at either side thereof.

6. In a conduit cap, a member formed on opposite sides for receiving and attachment to conduits of different diameters, respectively, the said member reversibly mounted to operatively present either side thereof.

7. A conduit cap comprising, an open side cap body, a closure plate removably secured in the open side of the body and opposite side axially alined bosses on said plate forming sockets of different diameters, respectively, for receiving and attachment to different size conduits, the said plate reversible to operatively present either side thereof.

8. A conduit cap comprising, a cap body having one side thereof open, a plate member removably and reversibly fitted in the open side of said body, said plate member having socket forming bosses extending from opposite sides thereof in substantial axial alinement for receiving and attachment to conduit ends of different diameters, respectively, and a conduit end receiving flange at the inner ends of and between the sockets formed by said bosses, the said plate member reversible to operatively present either side thereof.

9. In a conduit cap for attachment to a conduit, a member formed with a conduit and receiving socket thereon having the outer portion of its length of greater diameter than the remaining portion of its length, an internal shoulder at the inner end of the outer portion of greatest diameter, and a shoulder at the inner end of the inner portion of less diameter, said socket adapted to receive conduit ends of different diameters, respectively.

10. In a conduit cap, a member for attachment to a conduit, said member formed with communicating and axially alined conduit receiving sockets of different diameters, the diameters of said sockets, respectively, decreasing inwardly from the outermost socket, and a conduit end engaging shoulder at the inner end of each socket, whereby said member can receive and be attached to conduits of different diameters corresponding to the diameters of said sockets, respectively.

11. In a conduit cap, a plate member for attachment to a conduit, substantially alined bosses extending from opposite sides of said member, said bosses formed with axially alined bores longitudinally thereof of different diameters to provide sockets for receiving and attachment to conduits of corresponding diameters, respectively.

Signed at Park Ridge, New Jersey, this 6th day of December, 1928.

JACOB B. COOPER.